H. L. DOHERTY.
PROCESS OF OPERATING GAS FIRED FURNACES.
APPLICATION FILED MAR. 31, 1909.

1,214,520.

Patented Feb. 6, 1917.
3 SHEETS—SHEET 1.

WITNESSES
Louis F. O'Niel
Fred J. Smith

INVENTOR
Henry L. Doherty
BY
Frank S. Young
ATTORNEY

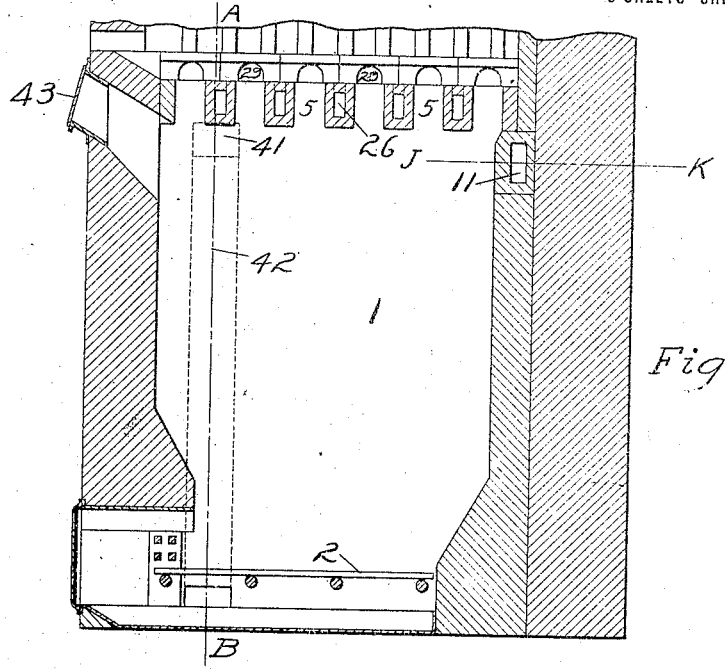
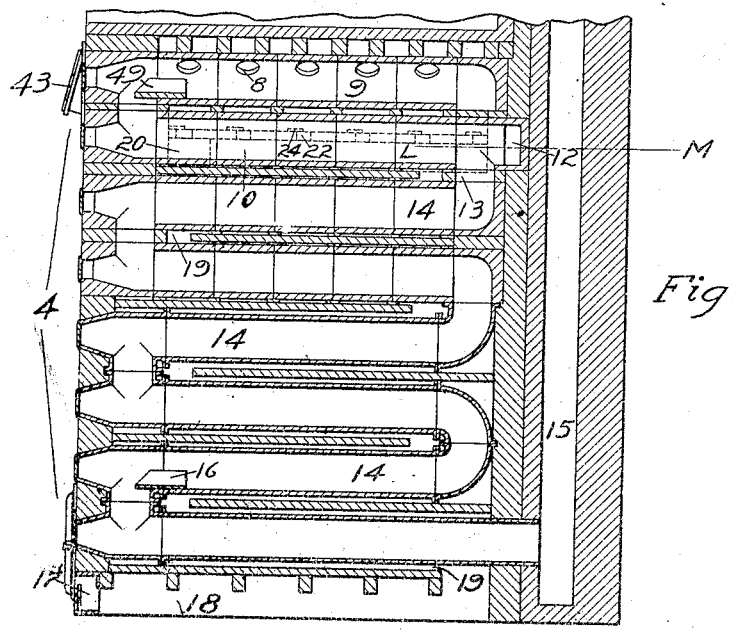

H. L. DOHERTY.
PROCESS OF OPERATING GAS FIRED FURNACES.
APPLICATION FILED MAR. 31, 1909.

1,214,520.

Patented Feb. 6, 1917.
3 SHEETS—SHEET 3.

WITNESSES
Louis F. O'Neil
Fred I. Smith

INVENTOR
Henry L. Doherty
BY
Frank S. Young,
ATTORNEY

UNITED STATES PATENT OFFICE.

HENRY L. DOHERTY, OF NEW YORK, N. Y.

PROCESS OF OPERATING GAS-FIRED FURNACES.

1,214,520.  Specification of Letters Patent.  Patented Feb. 6, 1917.

Application filed March 31, 1909. Serial No. 486,889.

*To all whom it may concern:*

Be it known that I, HENRY L. DOHERTY, a citizen of the United States, residing at New York city, in the county of New York and State of New York, have invented new and useful Improvements in Processes of Operating Gas-Fired Furnaces, of which the following is a specification.

My invention relates to a process of operating gas-fired furnaces and particularly, to the kind of such processes wherein water vapor is the medium used to control the temperature of combustion in the gas producing portion of the apparatus and is in the nature of an improvement to the method of operation of a gas bench disclosed in my Letters Patent No. 993,322, dated May 23rd, 1911, which process is claimed in my co-pending application Ser. No. 622,549, the same being a division of the application of said Letters Patent.

The objects of my invention are, the distribution of the products of combustion from the gas consuming portion of the apparatus between, the means for heating the air current supplied to the gas producing portion of the apparatus, and the means for heating the air current supplied to the gas consuming portion of the apparatus, in proportion to the quantity of heat required in the respective air heating means, without affecting the equal and uniform flow of the products of combustion through the gas consuming portion of the apparatus, the more efficient heating of the air current supplied to the gas producing portion of the apparatus, and the highest practicable recuperation of the sensible heat of the waste products of combustion.

My invention may be applied to any combination of a gas producer and furnace, in which the two are so located in relation to each other that the products of combustion from the furnace may be introduced into recuperators for heating the air and water vapor for combustion in the gas producer and the air for combustion in the furnace at substantially, the temperature at which they leave the furnace.

For purposes of illustration, I have shown my invention applied to an apparatus for the manufacture of illuminating gas by the destructive distillation of coal—commonly known as a gas bench.

Figure 6:
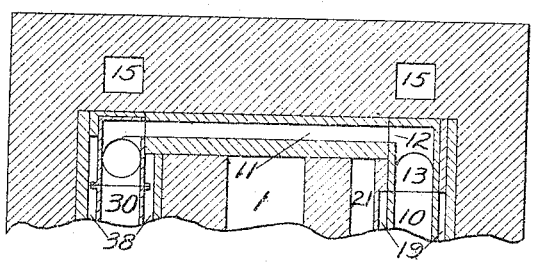
Figure 1:
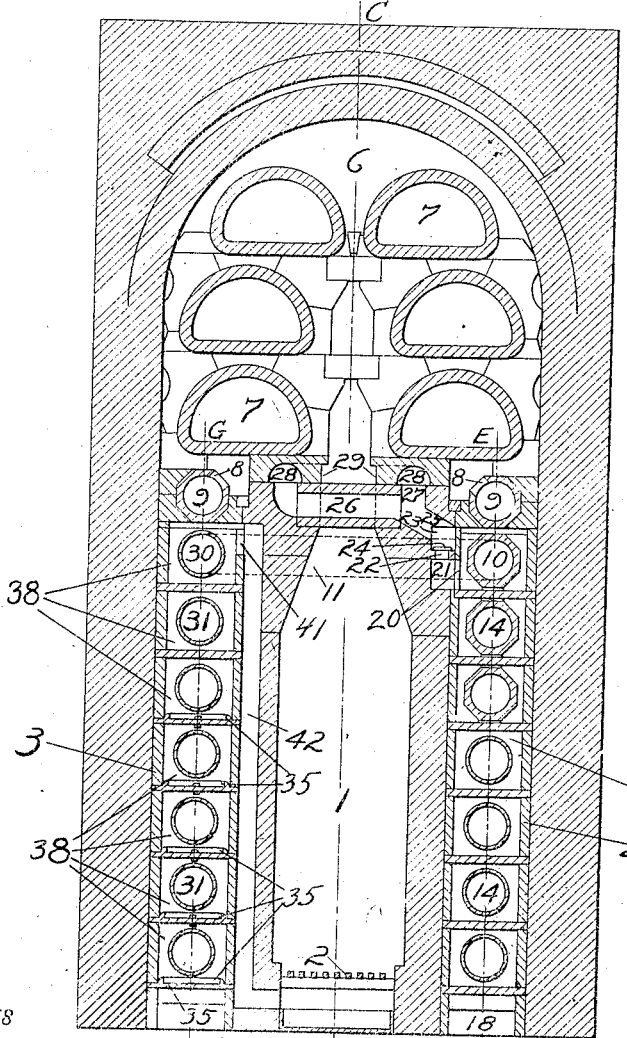
Figure 4:
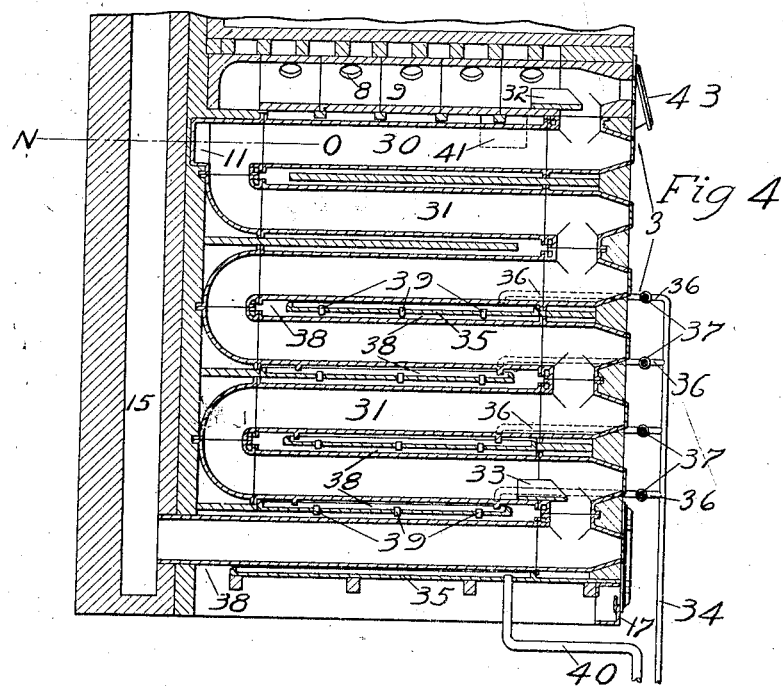
Figure 5:
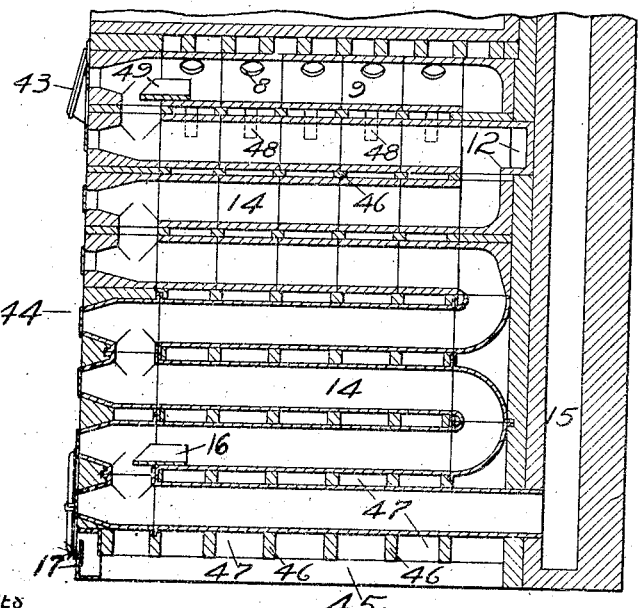

In the drawings, Figure 1 is a section through the gas bench on a plane parallel to the front thereof, on the line A—B, of Fig. 2. Fig. 2 is a longitudinal section through the bench on the line C—D, of Fig. 1. Fig. 3 is a section through the secondary air recuperator on the line E—F, of Fig. 1. Fig. 4 is a section through the primary air recuperator on the line G—H, of Fig. 1. Fig. 5 shows a secondary air recuperator of a slightly different design. Fig. 6 is a section of a portion of the rear part of the bench, taken on a horizontal plane, whose intersections on the views shown in Figs. 2, 3 and 4, are designated by the lines J—K, L—M, N—O, respectively.

Like numerals refer to like parts throughout the several views.

In the drawings, 1 is the gas producer, 2 the grate thereof. 3 the primary air recuperator. 4 the secondary air recuperator. 5, 5 are ports or openings in the arch of the producer for the passage of the producer gas into the retort oven 6.

7, 7 are the retorts. 8, 8 the orifices in the "take-off" flues 9.

10 is the uppermost waste gas flue of the recuperator 4. 11 a flue connecting with 10, through a port 12 and with the uppermost gas flue 30 of the recuperator 3.

13 a port connecting 10 with a series of return-bend flues 14. 15, 15 flues, one for each recuperator, leading to the stack of the bench.

16 is an adjustable damper for regulating the flow of waste gas through the flues 14.

17 is an opening with an adjustable damper, controlling the admission of air to the recuperator 4. 18 a flue leading the entering air to the back of the recuperator 4. 19 a series of return-bend flues. 20 a port connecting the uppermost flue 19, with an equalizing flue 21, having ports 22, connecting it with a parallel distributing flue 23.

24, etc., are adjustable dampers for regulating the free area of ports 22. 25, air flues connecting 23 with the cross-flues 26 and ports 27, which latter open into another equalizing flue 28, on the right-hand side of the retort oven. Flues 26 connect with another flue 28 on the left-hand side of the retort oven.

29 are the secondary air nostrils discharging the air from the flues 28 into the combustion chamber of the retort oven.

30 is the uppermost gas flue of recuperator 3, connected with and discharging into the series of return-bend flues 31.

32 is an adjustable damper in flue 9, on the same side of the retort oven as recuperator 3, for regulating the volume of combustion gases passing therethrough.

33 is another similar damper corresponding to damper 16 of recuperator 4.

34 is a water supply pipe connecting with water pans 35 through the connections 36, controlled by the valves 37. The water pans 35 are built into the recuperator 3 in such a manner that they divide it into a series of return-bend flues 38. The pans 35 are provided with overflow outlets 39, having their inlet orifices slightly raised above the bottom of the pans. A drain-pipe 40 discharges any excess of water from the lowermost of the pans 35.

41 is a port establishing communication between the uppermost of the flues 38 and a passage, or flue, 42, opening beneath the grate of the producer.

43 is the fuel charging chute of the producer.

In Fig. 5, 44 is a secondary recuperator of a slightly different type from that shown in Fig. 3. In this, there is a vertical air flue 45, having partitions 46, which serve to support the flue gas flues 14, and in effect divide the main air flue 45 into a group of sub-flues 47.

48 indicate the inlet orifices of a series of flues carrying the air from the upper part of the flue 45 to the secondary air nostrils of the furnace.

The method of operating the apparatus is as follows: A fire is started on the grate 2 of producer 1, and fuel is gradually charged into the producer through the chute 43 until a depth of from three to six feet has been attained, air in limited quantity mixed with water vapor being introduced beneath the grate 2. The oxygen of the air and water reacting with the fuel forms producer gas. This escapes from the producer through the ports 5, mingling with heated air which enters through the nostrils 29, and burning in the combustion chamber of the retort oven 6. The products of this combustion pass around the retorts 7, carbonizing the coal therein, and escape from the retort oven through the orifices 8 opening into the flues 9—one on either side of the oven. In normal working these two currents of products of combustion (which I shall hereafter refer to as flue gas) are equal in volume. By keeping the volume of flue gas passing through the two flues 9 equal, a uniform circulation of the products of combustion through the retort oven is insured. If now it is seen that under normal conditions of working one recuperator is hotter than the other or—putting it another way—that the gases are escaping to the chimney flue at a higher temperature on one side than on the other, by manipulating the dampers, 16 and 33, the flue gases can be distributed between the two recuperators in proportion to the quantity of heat required in each. If the heat required in the secondary recuperator is greater than the heat required in the primary recuperator the method of adjustment is as follows: After the dampers 32, and 49 have been adjusted so as to secure a uniform draw of gases from the two sides of the retort oven, the damper 16 is opened wider, and the damper 33 correspondingly closed. The result is that the resistance to the passage of the gases through the flues 31 has been increased and that through 14 diminished. In consequence a portion of the flue gas previously passing through 31, is diverted to 14 through the cross flue 11 until equilibrium has been established. By proper manipulation of the dampers the two currents of flue gas are so proportioned that the gas escaping to the chimney flues, leaves both recuperators at the same temperature. If the heat requirement in the primary recuperator is the greater, the damper 33 is opened wider and 16 partially closed.

The air enters the recuperator through an adjustable damper 17, passes through the flue to the back of the recuperator, thence through the flues 38. The air current is heated by the flue gas, passing through the flues 31, and in passing over the water in the pans evaporates the same. The overflow from the upper pans, dripping onto the flues 31 (which are of metal having a relatively high conductivity) greatly aids in the abstraction of heat from the flue gas, and the device promotes the rapid evaporation of the water.

It is to be noted that by keeping the air in contact with water until it has reached a comparatively high point in the recuperator, where the temperature of the heating gases is high, I insure the evaporation of a much greater proportion of water into the primary air than is possible with the old method of maintaining a body of water in the ash pan. By my method the amount of heat imparted to the water is increased as the temperature of the air, and therefore the quantity of vapor formed is increased as the vapor carrying capacity of the air is increased. Therefore the rate of evaporation of the water is increased with the vapor-carrying capacity of the air. In the upper flues the mixture of air and water vapor is subjected to further heating and, owing to the presence of the comparatively high proportion of water vapor, rapidly absorbs heat from the hot combustion gases passing through the flues 31. The flue gas passing through the inner flues gives up the greater part of its sensible heat to the water and air.

The current of mingled air and water vapor passes through the recuperator, being highly superheated in the upper flues thereof, and leaving the recuperator 3 through the opening 41 passes through the flue 42 into the ash pit of the producer. Passing up through the fuel bed the oxygen of the air and water combines with the carbon to form producer gas. This gas passes through the opening 5, mingles with the secondary air entering through the nostrils 29 and burns.

The secondary air enters the recuperator 4 through a damper 17', passes to the back of the recuperator through the flue 18, thence back and forth through the flues 19, taking up heat from the flue gas, at the same time passing through the flues 14. From the uppermost flue 19 the heated air passes through the port 20 into the equalizing flue 21. From 21 it passes through the series of ports 22 into the distributing flue 23. These openings 22 have movable tiles 24 covering them. By inserting an iron rod through an appropriate hand-hole at the front end of 23, the tiles 24 can be adjusted over the orifices 22 in such a way that the flow of air from 21 is uniform along the whole length. From 23, the air passes up through a series of flues 25. These flues 25 are connected with openings 27 into an equalizing flue 28, and with cross-flues 26, in the keys of the producer arch. A portion of the heated air passing through 25, enters the corresponding cross-flues 26 and passes into an equalizing flue 28 on the left-hand side of the retort oven. From 28 the air passes to the nostrils 29.

It is evident that I am not limited to the relative location of the air recuperators shown. Their relative positions may be the reverse of that shown without in any way changing the principle of operation.

My invention is not limited in its application to the particular type of apparatus shown, viz.—an apparatus for the manufacture of illuminating gas—but may be used in connection with numerous different types of furnaces in which the gas producer and furnace for the combustion of the gas have similar relations to each other.

The usual construction of a gas bench is such that it furnishes ideal conditions for the application of my invention thereto, but the invention may be applied with great advantage to zinc furnaces, re-heating furnaces, etc., and to all furnaces of the same general type.

The reaction on which the formation of producer gas mainly depends is that occurring when carbon is burned with an amount of oxygen insufficient for complete combustion, viz., $C_2+O_2=2CO$. This reaction is a highly exothermic or heat producing reaction, about 4450 B. T. U. being liberated for every pound of carbon so consumed.

Unless some means is provided for absorbing the surplus heat, thus generated, the temperature of the fuel bed would rise to a point sufficient to more or less completely sinter the ash of the fuel, forming large masses of so-called clinker. Besides, the high temperature is very hard on the walls of the producer itself; the clinker attaches itself to them, and when the doors are opened for the purpose of cleaning, the inrush of cold air causes a chilling and hardening of the clinker, which attaches itself firmly to the walls and must be removed by a chiseling tool. This operation is very hard on the walls, and producers so operated must be frequently relined. Besides, the high temperature rapidly warps the fire-bars of the grate, entailing a high cost of maintenance. For these reasons, and numerous others, it has been found necessary in the operation of gas producers to supply some heat absorbing medium to the fuel bed. This may be either water vapor or products of combustion.

In this present invention, I use the former of these two heat absorbing mediums. The reactions which take place in the fuel bed in this case are, (a) $C_2+O_2=2CO$
(b) $C_2+2H_2O$ (as vapor) $=2CO+2H_2$ Reaction (a) liberates about 4450 B. T. U. for every pound of carbon so consumed, while reaction (b) absorbs about 10340 B. T. U. per pound of carbon in the decomposition of the water, but liberates 4450 B. T. U. in the combustion of the carbon, per pound of the latter consumed, leaving a net absorption of about 5890 B. T. U.

By properly proportioning the amounts of air and water vapor supplied to the fuel bed, it is plain that I can exercise a control over the temperature of the producer.

Besides the advantage of being able to control the temperature of the fuel bed, there is also another important advantage in burning the carbon by the oxygen of the water. This is the saving of heat to the furnace that is effected by so doing.

In nearly all furnaces used for ordinary metallurgical and manufacturing operations there is a fixed minimum for the temperature at which the products of combustion may be discharged from the furnace. This minimum is fixed by the temperature required for the operation for which the furnace is designed. We can never, therefore, use directly in the furnace itself all the heat that is generated therein. We must invariably carry out of the furnace all the heat which is carried by the products of combustion at their temperature of discharge from the furnace. This heat can only be returned to the furnace indirectly, by using it to heat the air, or gas and air, supplied to the furnace, or, in some cases, the charge for the furnace. Now, since the amount of heat carried by the products of combustion at any temperature depends upon the weight and specific heat of the products, any decrease we can make in the weight of the combustion products for the same weight of carbon consumed means a proportionate reduction in the amount of heat carried out of the furnace.

When we burn the carbon by means of the oxygen of the air we must, of necessity, introduce with it its corresponding nitrogen—about 10 parts of nitrogen for every 3 parts of oxygen. On the other hand, the oxygen of the water is unaccompanied by any impurity, the accompanying hydrogen being itself an efficient fuel. It follows, therefore, that the greater the proportion of the carbon of the fuel that we can burn by means of oxygen derived from water, the more efficient in the utilization of heat will our apparatus become.

In the present invention, I use the waste products of combustion to heat, not only the air supplied to the producer, but also to vaporize and heat the water supplied thereto. By this means I not only return to the furnace part of the otherwise wasted heat of the products of combustion, but, at the same time, by increasing the proportion of the carbon that I can burn by the oxygen of the water, diminish proportionately the loss in the products of combustion, by diminishing the nitrogen per unit of carbon consumed on the grate.

Now, in the working of this invention—assuming that the air-water vapor current supplied to the producer, and the air current supplied to the furnace proper (which I shall hereafter call the primary current and the secondary current, respectively) are raised to the same temperature—much more heat is required in the heating of the primary current than is required in the heating of the secondary current owing to the heat required for the evaporation of the water. If, however, I draw off from the furnace, directly, a proportionately larger volume of the products of combustion (which I shall hereafter call waste gases) to heat the primary current I interfere with the uniform distribution of heat throughout the furnace chamber by increasing the draft locally through the portion from which I am drawing off the greater share of waste gases. This statement is particularly true in reference to the specific apparatus that I have shown. As applied to that, the result of the unequal distribution of the gases in the furnace or retort oven, would be that the retorts on the side of the oven above the primary recuperator would be hotter, while the ones on the side above the secondary recuperator would be cooler.

Now, in the operation of a gas plant, it is the practice to charge and draw the retorts at regular and uniform intervals. The unequal distribution of the gases would result in the charges in some of the retorts being undercarbonized, while the charges in others would have been subjected to a needlessly high temperature. It is the overcoming of this unbalanced working of the furnace, while at the same time securing the highest efficiency of the recuperator, which is the object of this present invention. This end I accomplish, in the manner shown, by withdrawing from the recuperator requiring the least heat a portion of the flue gases that left the retort oven on that side and passing them through the recuperator requiring the greater amount of heat.

By means of the apparatus I have herein shown and described, I may not only secure a perfect balance in the circulation of the products of combustion in the retort oven, or (to put it another way) not only secure a uniform discharge of the products of combustion from the two sides of the retort oven, but, by effecting a redistribution of the products of combustion, after they have been withdrawn from the retort oven, between the streams going to the respective recuperators, am able to supply to each recuperator a share of the hot gases commensurate with the work which it has to do. I am able to secure this uniform distribution of the products of combustion by properly adjusting the dampers 49 and 16 and 32 and 33. By means of the damper 49 I adjust the discharge opening in the flue 9 of recuperator 4 until the friction or retardation to which the gaseous current passing through this opening is subjected is substantially equal to that to which the current passing through the flue 9 of recuperator 3 is subjected. When this adjustment has been properly made, under normal working conditions, I can increase or decrease the volume of flue gas diverted from the primary to the secondary recuperator, or vice versa, by the proper manipulation of the dampers 33 and 16 without in any way disarranging the substantially uniform draw of products of combustion from the two sides of the retort oven.

Having described my invention, what I claim is:

1. The process which comprises withdrawing products of combustion from a furnace chamber in a direction of flow substantially transverse to the longitudinal dimension of said furnace chamber as two currents of substantially the same velocity and volume, the velocity of said transverse flow of said currents of products of combustion being maintained substantially the same at all points along the length of said furnace chamber, and distributing said products of combustion of said two currents, after they have been withdrawn from said furnace chamber in regulated proportion between the said two currents, passing the first of said currents of products of combustion through a recuperator to evaporate and heat water and to heat air supplied to a gas-producing apparatus, passing the second of said currents of products of combustion through another recuperator to heat air supplied for the combustion of gas produced in the gas-producing apparatus, the relative volumes of the said two currents of products of combustion being proportioned to the quantity of heat required by the respective air currents, passing the air supplied to said gas-producing apparatus while said air is in process of heating in contact with water, whereby the said air current is loaded with water vapor, superheating the mixture of air and water vapor so produced by the first of said currents of products of combustion, introducing the superheated mixture into said gas-producing apparatus to generate producer gas, and burning said gas by means of the air heated by the second of said currents of products of combustion.

2. The method of operating a gas-heated furnace which comprises heating the air supplied for maintaining combustion in the gas producer of said furnace by a current of hot products of combustion discharged from said furnace, adding water vapor to the said air current while the same is being heated, the said water vapor being added in a plurality of portions, the magnitude of said portions of water vapor increasing with the increased vapor-carrying capacity of the said air current, introducing the mixture of air and water vapor into the said gas producer to generate producer gas, heating a second current of air by a second current of hot products of combustion, conducting the said second current of air and said producer gas into said furnace and burning the said gas therein, withdrawing the products of the said combustion from said furnace as two substantially equal currents and thereafter adjusting the relative amounts of products in said currents by transfer from one to the other, the relative volumes of the two currents being proportioned to the relative quantities of heat required in the heating of the respective air currents.

3. The process which comprises withdrawing the products of combustion from the furnace chamber of a gas consuming apparatus in a plurality of portions of equal volume along the length of said furnace chamber in such manner as to produce a substantially uniform flow at the various points and thereafter producing from such uniform portions two currents of products of combustion of adjusted relative volume by transfer of products of combustion from one such current to the other such current, passing the first of said currents through a recuperator to evaporate and heat the water and to heat the air supplied to a gas producing apparatus, passing the second of said currents through another recuperator to heat the air supplied for the combustion of the gas produced in the gas producing apparatus, the relative volumes of the two currents being proportional to the amount of heat required by the respective air currents, passing the air supplied to said gas producing apparatus while said air is in process of heating in contact with water, whereby the said air current is loaded with water vapor, superheating the mixture of air and water vapor so produced, introducing the superheated mixture into said gas producing apparatus to generate producer gas, and burning said gas by means of the air heated by the second of said currents of products of combustion.

Signed at New York city, in the county of New York and State of New York this 30th day of March 1909.

HENRY L. DOHERTY.

Witnesses:
  LOUIS F. MEISEL,
  FRED I. SMITH.